United States Patent
Goodyear et al.

(10) Patent No.: US 11,897,141 B2
(45) Date of Patent: Feb. 13, 2024

(54) AUTOMATED FASTENING SYSTEM

(71) Applicant: Palletec, LLC, Fridley, MN (US)

(72) Inventors: Case Goodyear, Scandia, MN (US); Jerry Vang, Fridley, MN (US); Jon Denney, Woodbury, MN (US); Mark Chevalier, Andover, MN (US)

(73) Assignee: PALLETEC, LLC, Fridley, MN (US)

( * ) Notice: Subject to any disclaimer, the term of this patent is extended or adjusted under 35 U.S.C. 154(b) by 458 days.

(21) Appl. No.: 16/688,794

(22) Filed: Nov. 19, 2019

(65) Prior Publication Data

US 2020/0156247 A1    May 21, 2020

Related U.S. Application Data

(60) Provisional application No. 62/769,399, filed on Nov. 19, 2018.

(51) Int. Cl.
   *B25J 5/04*    (2006.01)
   *B25J 9/16*    (2006.01)
   *B25J 11/00*   (2006.01)
   *B25J 13/08*   (2006.01)

(52) U.S. Cl.
   CPC ............ *B25J 9/1664* (2013.01); *B25J 5/04* (2013.01); *B25J 9/1694* (2013.01); *B25J 11/005* (2013.01); *B25J 13/086* (2013.01)

(58) Field of Classification Search
   CPC ........ B25J 9/026; B25J 13/086; B25J 9/1694; B25J 9/1664; B25J 5/04; B25J 11/005
   See application file for complete search history.

(56) References Cited

U.S. PATENT DOCUMENTS

| | | | |
|---|---|---|---|
| 2,856,606 | A | 10/1958 | Richards |
| 2,958,938 | A | 11/1960 | Nicklasson et al. |
| 3,207,403 | A | 9/1965 | Stoddard |
| 3,261,527 | A | 7/1966 | Sterner |
| 3,273,776 | A | 9/1966 | Bryson |
| 3,526,743 | A | 9/1970 | Spisak |
| 3,557,439 | A | 1/1971 | Dykeman |
| 3,591,067 | A | 7/1971 | Vial |
| 3,755,871 | A | 9/1973 | Nelson, Jr. |
| 3,763,547 | A | 10/1973 | Blakeslee |
| 3,945,549 | A | 3/1976 | Colson |
| 3,968,560 | A | 7/1976 | Vial |
| 4,054,236 | A | 10/1977 | Paxton |

(Continued)

OTHER PUBLICATIONS

Non-Final Office Action dated Apr. 30, 2019 in related U.S. Appl. No. 15/330,135, now abandoned.

(Continued)

*Primary Examiner* — Stephen Holwerda
(74) *Attorney, Agent, or Firm* — Cozen O'Connor (57) ABSTRACT

A robotic fastening system is operative to autonomously fasten a first subassembly to a second subassembly at a plurality of fastening sites. A set of actuators arranged to move a fastening tool to the various ones of the fastening sites. A proximity sensor is fixed proximate the fastening tool and movable with the fastening tool. A controller circuit is operative to individually control each of the set of actuators and to read an output of the proximity sensor, where the controller circuit is programmed to execute a fastening-tool movement routine to move the fastening tool to a first one of the fastening sites.

18 Claims, 7 Drawing Sheets

(56) References Cited

U.S. PATENT DOCUMENTS

| | | | |
|---|---|---|---|
| 4,077,106 A | 3/1978 | Lichtenstein et al. | |
| 4,168,566 A | 9/1979 | Streckert | |
| 4,204,624 A | 5/1980 | Gunn et al. | |
| 4,235,005 A | 11/1980 | James | |
| 4,241,495 A | 12/1980 | Wakeem | |
| 4,311,293 A | 1/1982 | Tenniswood | |
| 4,373,651 A | 2/1983 | Fanslow | |
| 4,392,600 A | 7/1983 | Billett et al. | |
| 4,403,388 A | 9/1983 | Belcher | |
| 4,487,355 A | 12/1984 | Ginnow et al. | |
| 4,489,874 A | 12/1984 | Worst et al. | |
| 4,492,016 A | 1/1985 | Smets et al. | |
| 4,503,993 A | 3/1985 | Ginnow et al. | |
| 4,627,564 A | 12/1986 | Bowser | |
| 4,651,601 A * | 3/1987 | Sasaki | G05B 19/4061 83/13 |
| 4,757,605 A | 7/1988 | Richardelli | |
| 4,782,989 A | 11/1988 | Wallin et al. | |
| 4,793,540 A | 12/1988 | Mangan et al. | |
| 4,824,004 A | 4/1989 | Hanson | |
| 4,835,710 A * | 5/1989 | Schnelle | G05B 19/41 901/14 |
| 4,867,364 A | 9/1989 | Wallin et al. | |
| 4,900,329 A | 2/1990 | Richardelli | |
| 5,052,307 A | 10/1991 | Morrison | |
| 5,058,795 A | 10/1991 | Tonus | |
| 5,095,605 A | 3/1992 | Tonus | |
| 5,108,350 A | 4/1992 | Szpakowski | |
| 5,249,352 A | 10/1993 | Landers | |
| 5,312,022 A | 5/1994 | Thompson et al. | |
| 5,335,499 A | 8/1994 | Thompson et al. | |
| 5,375,315 A | 12/1994 | Griffith et al. | |
| 5,379,513 A | 1/1995 | Thompson et al. | |
| 5,480,087 A | 1/1996 | Young et al. | |
| 5,555,617 A | 9/1996 | Pope | |
| 5,715,985 A | 2/1998 | Letson | |
| 5,848,458 A * | 12/1998 | Bullen | B23P 21/004 29/33 K |
| 5,904,789 A * | 5/1999 | Durkos | B27F 7/17 382/152 |
| 5,984,621 A | 11/1999 | Letson | |
| 6,176,009 B1 | 1/2001 | Inman | |
| 6,430,800 B1 | 8/2002 | Buck | |
| 6,499,206 B1 | 12/2002 | Eure et al. | |
| 6,817,090 B1 | 11/2004 | McAdoo et al. | |
| 6,926,185 B2 | 8/2005 | Svensson | |
| 7,228,997 B1 | 6/2007 | Thompson | |
| 7,472,474 B2 | 1/2009 | Jaen | |
| 7,648,047 B2 | 1/2010 | Lewis et al. | |
| 2002/0104210 A1 | 8/2002 | Buck | |
| 2007/0108682 A1 | 5/2007 | Holliger | |
| 2008/0216336 A1 * | 9/2008 | Wood | B24B 19/26 33/551 |
| 2008/0295708 A1 | 12/2008 | Madgar | |
| 2011/0282492 A1 * | 11/2011 | Krause | B25J 9/1664 901/47 |
| 2012/0037753 A1 | 2/2012 | Huber et al. | |
| 2014/0257558 A1 * | 9/2014 | Frische | B25J 9/1664 700/245 |
| 2015/0191923 A1 | 7/2015 | Weiszbrod | |

OTHER PUBLICATIONS

Non-Final Office Action dated Mar. 28, 2019 in related U.S. Appl. No. 15/488,877, now U.S. Pat. No. 10,486,328, issued Nov. 26, 2019.

Response to Non-Final Office Action dated Mar. 28, 2019, filed Jun. 28, 2019, in related U.S. Appl. No. 15/488,877, now U.S. Pat. No. 10,486,328, issued Nov. 26, 2019.

Non-Final Office Action dated Apr. 29, 2019 in related U.S. Appl. No. 15/581,897, now U.S. Pat. No. 10,549,451, issued Feb. 4, 2020.

Response to Non-Final Office Action dAted Apr. 29, 2019, filed Jul. 29, 2019, in related U.S. Appl. No. 15/581,897, now U.S. Pat. No. 10,549,451, issued Feb. 4, 2020.

Non-Final Office Action dated Jan. 6, 2020 in related U.S. Appl. No. 15/910,048.

Response to Non-Final Office Action dated Jan. 6, 2020, filed Apr. 6, 2020, in related U.S. Appl. No. 15/910,048.

Viking Engineering & Development, Viking Service, Skute Parts Book, Dec. 2013, 37 pages, Viking & Development, Fridley, MN.

\* cited by examiner

AUTOMATED FASTENING SYSTEM

PRIOR APPLICATION

This Application claims the benefit of U.S. Provisional Application No. 62/769,399, entitled "BEDDING MACHINE," and having a filing date of Nov. 19, 2018, the disclosure of which is incorporated by reference herein.

TECHNICAL FIELD

The present application generally relates industrial manufacturing machinery and processes and, more particularly, to automated systems and related methods for assembling a mesh structure to a frame structure.

BACKGROUND

In automated manufacturing, operational speed, accuracy, and process uptime are paramount concerns. Processing speed and uptime are essential for maximizing factory resources (e.g., floor space, energy, etc.) and return on investment (ROI) in the assembly equipment and facilities. Accuracy is essential to reducing process stoppages and costly rework operations, and impacts the quality of the manufactured articles.

As an example, in the manufacture of furniture such as seating and bedding pieces, a mesh structure is typically fastened to a frame structure. The frame structure may be of any suitable material, such as natural wood, or manufactured or recycled material, such as plywood, fiberboard, particle board, plastic, composite material, or metal. The mesh structure is typically a wire mesh, which may carry springs or other structures. To accomplish the fastening in this example, staples are driven over wires of the mesh structure into the frame structure to secure the former to the latter at multiple fastening sites.

There is a need for practical solutions that provide performance and reliability improvements over existing methods and machinery for mesh fastening.

SUMMARY

One aspect of the disclosure is directed to a mesh-fastening system. The system includes a materials receiving zone and a working zone adjacent to the materials receiving zone. The materials receiving zone includes a receiving surface arranged to receive a frame subassembly and a mesh subassembly that is not fastened to the frame subassembly while a second frame subassembly and a second mesh subassembly are in the working zone, and the working zone includes a robotic fastening system operative to autonomously fasten the mesh subassembly to the frame subassembly at a plurality of fastening sites, the working zone further including a retractable boundary structure arranged to selectively permit or prevent movement of the frame subassembly along a forward direction. A conveyor including a first pushing surface and a second pushing surface is mechanically coupled to a shuttling actuator, the conveyor arranged to advance the frame subassembly and mesh subassembly to the working zone from the receiving zone while advancing the second frame subassembly and the second mesh subassembly from the working zone by operation of the shuttling actuator. The shuttling actuator is operative to cause the first pushing surface to engage with the frame subassembly and translate the frame subassembly and mesh subassembly into the working zone along the forward direction; cause the second pushing surface to engage with the second frame subassembly and translate the second frame subassembly and the second mesh subassembly out from the working zone along the forward direction while the retractable boundary structure is in a retracted position; and maintain a biasing force on the frame subassembly along the forward direction while the frame subassembly is in the working zone and the retractable boundary structure is in an engaged position.

According to a related aspect of this disclosure, a robotic fastening system is operative to autonomously fasten a first subassembly to a second subassembly at a plurality of fastening sites. In the system, a fastening tool is arranged to deploy fasteners to secure portions of the first subassembly to the second subassembly at various ones of the fastening sites. A set of actuators is arranged to move the fastening tool to the various ones of the fastening sites, with fastening tool being movable along a longitudinal direction, a transverse direction, and a height direction. A proximity sensor is fixed proximate the fastening tool and movable with the fastening tool. A controller circuit is operative to individually control each of the set of actuators and to read an output of the proximity sensor, wherein the controller circuit is programmed to execute a fastening-tool movement routine to move the fastening tool to a first one of the fastening sites. Accordingly, the fastening tool is initially moved toward a nominal expected position of the first one of the fastening sites according to a predefined movement profile. On approach of the fastening tool to the first one of the fastening sites, an output of the proximity sensor is compared against first detection criteria. In response to satisfaction of the first detection criteria, the motion of the fastening tool is adjusted and the output of the proximity sensor is compared against second detection criteria that is different from the first detection criteria. In response to satisfaction of the second detection criteria, the fastening tool deploys a fastener to secure the first subassembly to the second subassembly at the first one of the fastening sites.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Aspects of the present disclosure are generally directed to a mesh fastening system (MFS), and methods for operation of a MFS. The MFS may be used in automated assembly of a variety of items, such as furniture, mattresses, pallets, etc. In the present context, a mesh is an interwoven or intertwined structure. It may be made from wire, plastic strands, webbing, fabric, or other material, whether unitary or composite. One aspect of the present disclosure relates to automated handling and fastening of frame and mesh subassemblies by a MFS where a fastening operation, such as stapling, nailing, screwing, spot welding, soldering, or the like, can take place according to some embodiments of the present subject matter.

As will be described in detail below, the MFS may include, or be interfaced with, a controller, which may be implemented in various embodiments, such as an embedded system, or as part of a computer system. A variety of computer system implementations bay be realized, such as using one physical machine, or distributed among multiple physical machines, such as by role or function, or by process thread in the case of a cloud computing distributed model. In various embodiments, aspects of the controller may be configured to run in virtual machines that in turn are executed on one or more physical machines. Thus, it will be understood by persons of skill in the art that features of the invention may be realized by a variety of different suitable machine implementations.

Figure 1:
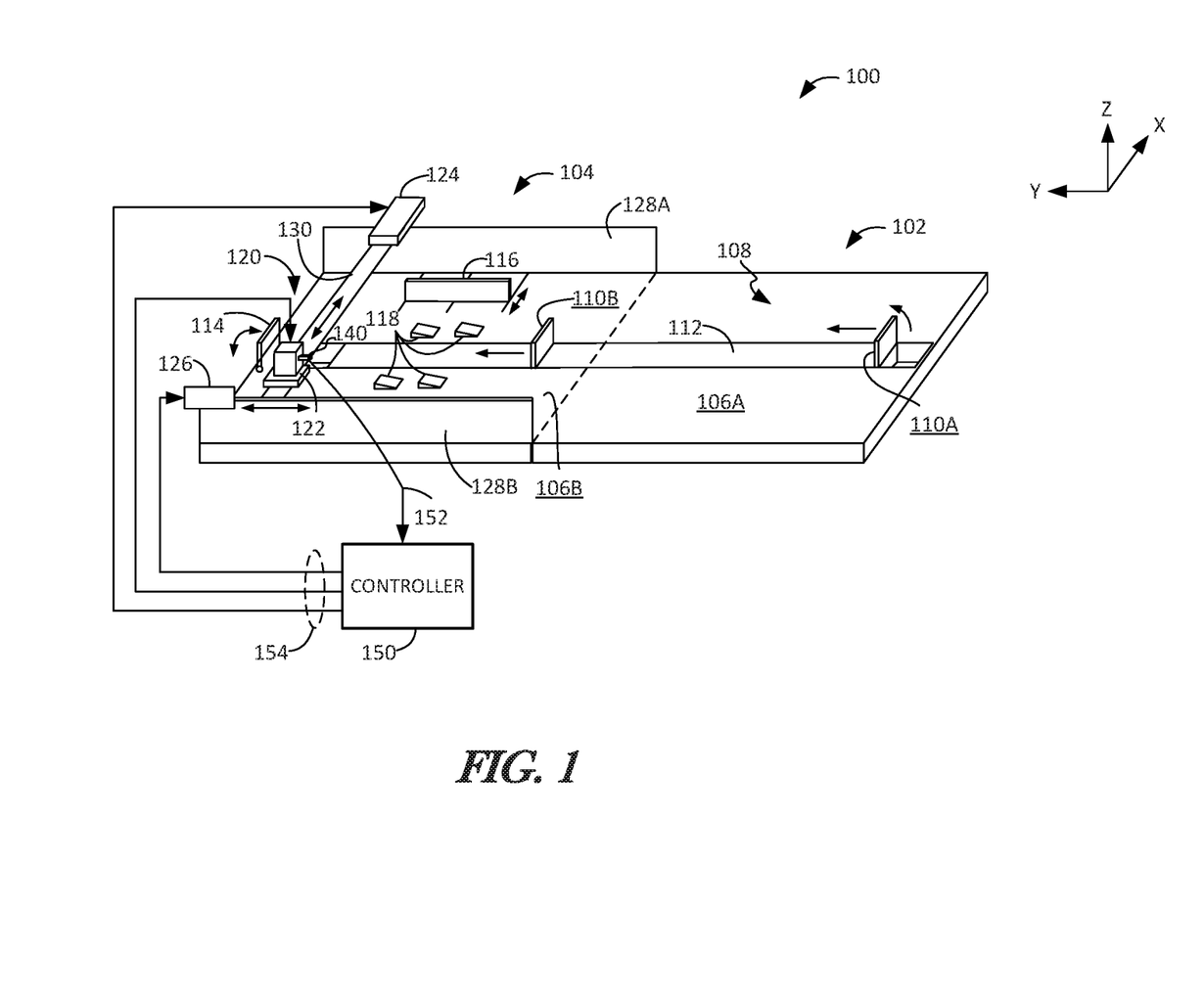
FIG. 1 is a schematic diagram illustrating a mesh fastening system (MFS) according to a simplified example.

FIG. 1 is a schematic diagram illustrating a MFS 100 according to a simplified example.

MFS 100 includes a materials receiving zone 102, and a working zone 104. The materials receiving zone 102 has receiving surface 106A, which is arranged to receive unfastened frame and mesh subassemblies (not shown in FIG. 1 for clarity). In general, the frame subassembly may be placed directly on receiving surface 106A, whereas the mesh subassembly may be placed on the frame subassembly and aligned therewith. Receiving zone 102 is employed primarily as a staging area, whereas working zone 104 is where the fastening operations are carried out. Notably, receiving zone 102 may accept the frame and mesh subassemblies while working zone 104 is operating on a different frame and mesh subassembly pair.

In related embodiments, MFS 100 includes provisions for advancing the frame and mesh subassemblies from receiving zone 102 to working zone 104 along the forward (Y-axis) direction. In one example, as depicted schematically in FIG. 1, conveyor 108 includes first pushing surface 110A and second pushing surface 110B, each of which is constructed to engage with an edge of the frame subassembly as it moves in the forward direction. Pushing surfaces 110A and 110B are each a part of a corresponding paddle structure that, in turn, is coupled to linear traveler 112. Linear traveler 112 may be powered by shuttling actuator such as a motor (not shown). In various embodiments, linear traveler 112 may be formed as a loop (e.g., belt, chain, or band) that passes along and beneath the working surface 106B.

Notably, in one type of embodiment, conveyor 108 is used to hold and stabilize the frame subassembly when it is undergoing fastening operations in working zone 104. In an example, a servo motor with controllable torque is used to linear traveler 112. A retractable boundary structure 114 is engaged in its active (up) position when the frame subassembly is to remain in place in working zone 104. Using the controllable torque of the servo motor, conveyor 108 applies and maintains a specific biasing force against the end of the frame subassembly to push the frame subassembly against engaged boundary structure 114.

In related embodiments, additional provisions are included to further retain and stabilize the frame subassembly during fastening operations. As depicted, lateral guides 116 (only one of which is visible in FIG. 1) are movable along the x-axis perpendicularly to the forward direction to hold the frame subassembly in a laterally fixed position. In a related embodiment, a set of support structures 118 protrude from the working surface 106B of working zone 104.

Figure 2:
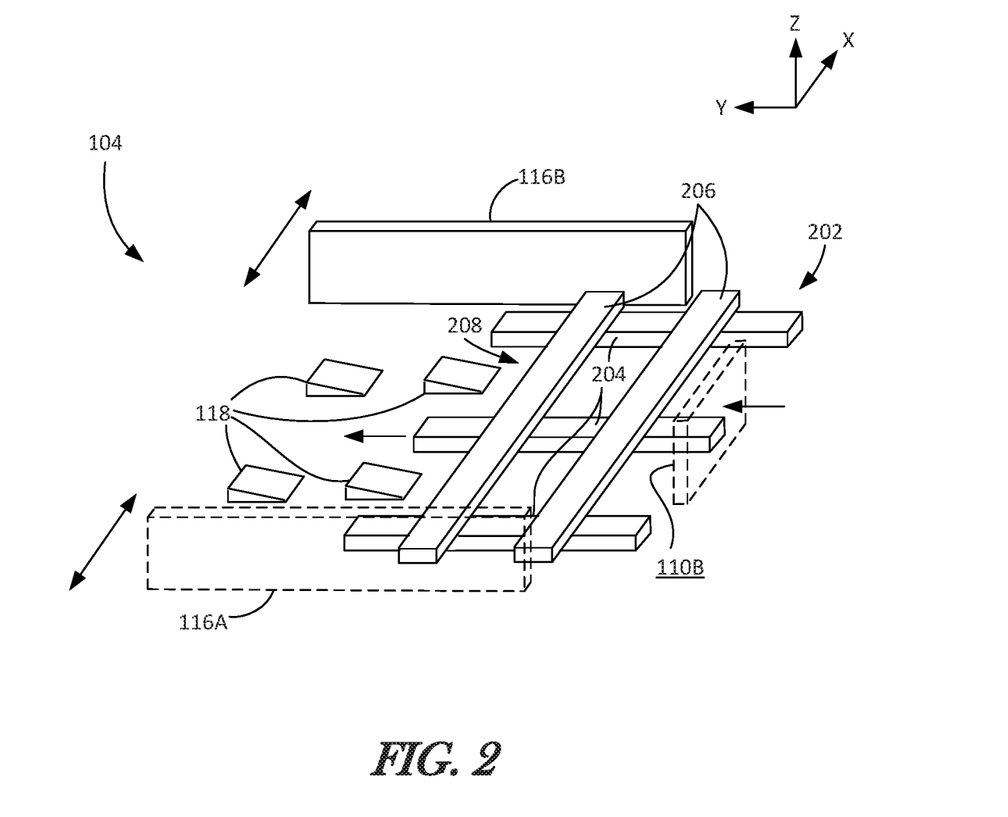
FIG. 2 is a simplified schematic diagram illustrating a portion of a working zone of the MFS of FIG. 1 in greater detail according to some embodiments, with a number of other features omitted for the sake of clarity.

FIG. 2 is a simplified schematic diagram illustrating a portion of working zone 104 in greater detail according to some embodiments, with a number of other features omitted for the sake of clarity. Frame subassembly 202 is shown without a mesh subassembly (which would be situated over frame subassembly 202 in an operational setting). Frame subassembly 202 includes bearer boards 204 oriented along the forward direction (Y-axis), and slats 206 that run perpendicularly to the bearer boards 204 along the transverse direction (X-axis). Slats 206 span gaps 208 between the bearer boards 204. During the fastening operations, the spanning portions of slats 206 may vibrate, thus complicating the placement of fasteners and ultimately impacting the throughput of MFS 100.

In an embodiment that addresses this challenge, support structures 118 are arranged to support the spanning portions of the frame subassembly. In one example, as shown, support structures 118 are formed as ramps having heights that increase toward the forward direction (with the height itself being defined along the Z-axis). With this arrangement, as frame subassembly 202 is advanced in the forward direction, the engagement between the structures 118 and the bottom surfaces of slats 106 is progressively strengthened.

In a related embodiment (not shown), support structures are actuated along the Z-axis to engage with the bottom surfaces of slats 206 when frame subassembly 202 is subject to fastening operations in working zone 104. These support structures may have flat, rather than inclined, upper surfaces.

FIG. 2 also depicts lateral guides 116A and 116B, which may be movable inwards from one another along the X-axis to align and hold the frame subassembly 202 and the mesh subassembly for the fastening operations.

Referring once again to FIG. 1, working zone 104 includes a robotic fastening system that is operative to autonomously fasten the mesh subassembly to the frame subassembly at a plurality of fastening sites. As depicted in the simplified example of FIG. 1, fastening tool 120, which may be a stapler, nailer, screwdriver, welder, etc., is mounted on a Z-actuator 122, and coupled to X-actuator 124 and Y-actuator 126. The X and Y actuators, 124 and 126, respectively, are incorporated with a gantry structure that includes tracks 128A, 128B and crossbar 130 (also containing tracks). Tracks 128A, 128B facilitate movement of fastening tool 120 along the Y-axis, whereas crossbar 130 facilitates movement of fastening tool 120 along the X-axis.

Each actuator 122, 124, 126 may be implemented using a servo motor, gearbox, and rotational-to-linear motion conversion mechanism such as a rack and pinion, belt drive, or the like.

There may be separate actuators for retractable boundary structure 114, one or both lateral guides 116, conveyor 108, and support structures 118, where applicable, although these actuators are not shown for the sake of clarity. Various ones of these actuators may be electromotive, pneumatic, or hydraulic in principle.

At least one proximity sensor 140 is fixed to the fastening tool. In various embodiments, proximity sensor 140 may utilize optical sensing technology, such as laser-based distance sensing (e.g., time-of-flight, triangulation, etc.) or confocal chromatic sensing, for example. Proximity sensor 140 has sufficient sensitivity and precision to facilitate the detection of strands of the mesh subassembly. Additional sensors may be provided, such as proximity sensors to be used for detecting placement of the frame and mesh subassemblies in materials receiving zone 102, and for operator safety, for example.

Controller 150 includes circuitry that implements logic for coordinating the operation of actuators 122, 124, 126, and others. In some implementations, controller 150 may be a processor-based system, such as a programmable logic controller (PLC), a microcontroller configured by embedded firmware or software, a computing device such as a personal computer (PC) system configured by suitable software running over an operating system, or a special-purpose digital controller device, according to various examples. In related examples, controller 150 may be implemented using digital logic circuitry such as a field-programmable gate array (FPGA) or the like, which implements sequential logic. Controller 150 produces outputs 154, which in the illustrated example include signals to various actuators. In addition, controller 150 may include sensor input 152 that receives information from one or more of the proximity sensors 140, and any other sensors.

Figure 3:
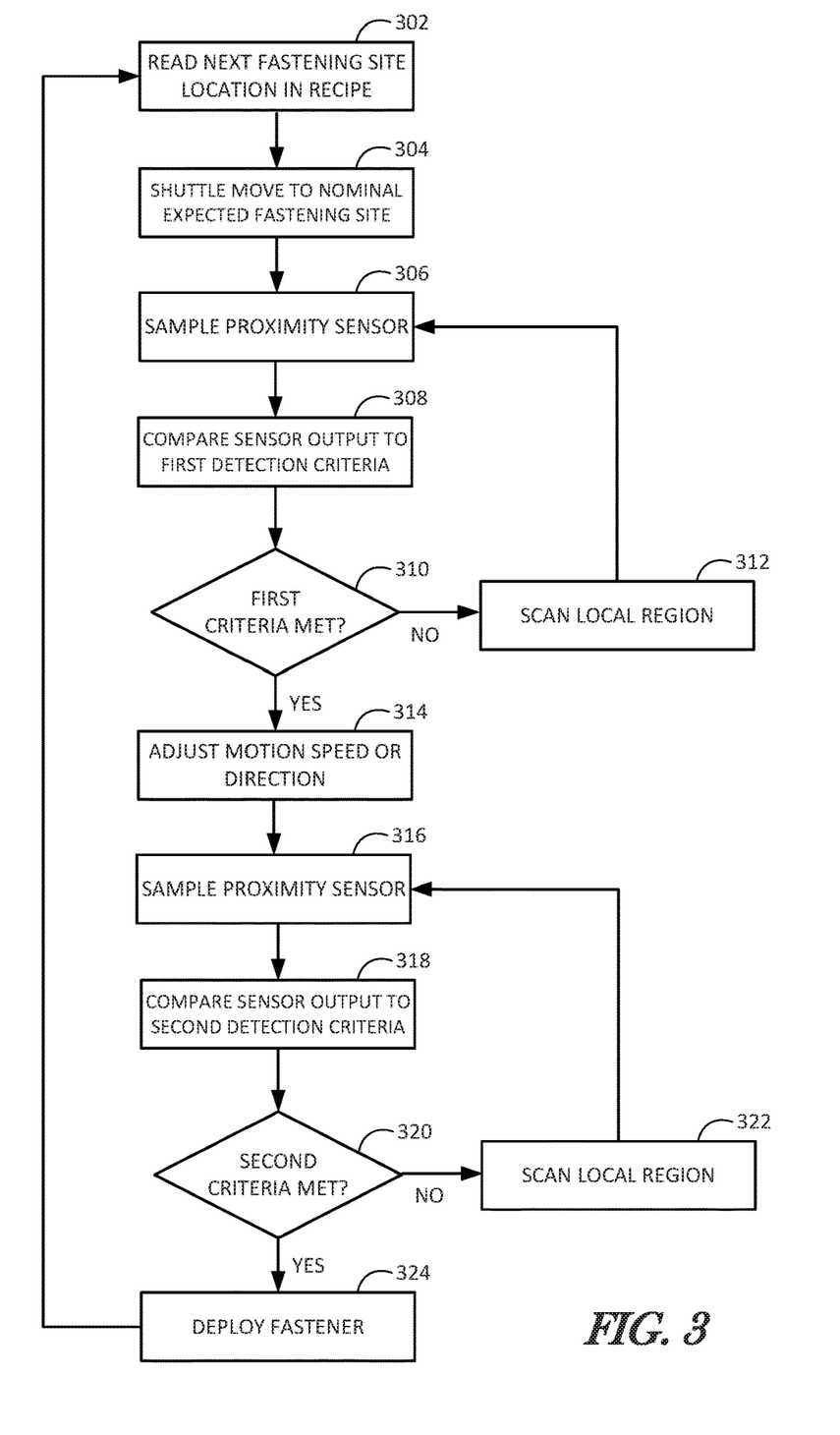
FIG. 3 is a flow diagram illustrating a process that may be carried out by a controller for controlling the approach of a fastening tool to a fastening site according to various embodiments.

FIG. 3 is a flow diagram illustrating a process that may be carried out by controller 150 for controlling the approach of the fastening tool 120 to a fastening site according to various embodiments. At 302, the location of the next fastening site is read. Generally, the fastening sites are known approximately. However, there may be significant variation from one individual subassembly to another, making a purely a priori positioning of the fastening tool impractical. Accordingly, some embodiments utilize object sensing techniques using proximity sensing to find the correct fastening site location. Advantageously, related embodiments combine a priori positioning of the fastening tool (which is generally fast but inaccurate) with controlled detection of the fastening site (which is slower but generally more accurate).

Turning to FIG. 3, at 302, controller 150 reads the next fastening site location in a recipe that corresponds to the type of article being assembled from the frame subassembly and mesh subassembly. At 304, controller 150 coordinates operation of the X and Y actuators and, if necessary to avoid any collisions with upwardly-protruding portions of the mesh subassembly or parts of the MFS, the Z actuator, to perform a relatively high-speed shuttle move of the fastening tool to the approximate fastening site. The shuttle move may be linear and translational within a single plane, or it may involve variation of the height of the fastening tool during X-Y movement to avoid obstacles. In some embodiments, a parabolic, elliptical, or semi-elliptical movement trajectory is used for the shuttle move to purposely avoid known topographic features. Various different subassemblies may call for different movement profiles.

Notably, during movement (even movement according to a predefined movement profile) the proximity sensor may be sampled at 306 to check for any possibility of collisions. In the case of an impending collision, the movement speed, trajectory, or some combination thereof, may be adjusted to avoid the collision.

As the fastening tool approaches the nominal location of the fastening site, the movement speed or trajectory may be automatically adjusted regardless of any lack of sensed proximity in order to facilitate locating the actual fastening site. For instance, the speed may be reduced to increase the spatial granularity of the sampling of proximity measurement.

At 308, first detection criteria is applied to the sensed proximity samples. In an example, the first detection criteria is optimized to detect an edge of the frame subassembly, such as a leading edge of a slat. In response to a failure of detection within a predefined distance of the nominal fastening site, the movement of the fastening tool may be further adjusted to perform a scanning routine at 312, within a defined region around the nominal expected fastening site.

The process loops back to 306, where the proximity sensor 140 is sampled so that the first detection criteria may be applied to the newly-acquired samples. If the first criteria was met at decision 310, the process advances to 314, which calls for adjustment of speed or direction of movement. As an example, a reduction of speed may further enhance the proximity sensing performance. In another example, adjustment of the direction of travel may enhance fastening site detection by approaching the site at an angle that facilitates repeatable detection, such as approaching a portion of the mesh subassembly from an angle that is perpendicular to the expected neutral axis of a wire. At 316, the proximity sensor is sampled, and at 318 the sensor output is compared against second detection criteria. In an example, the second detection criteria is optimized to detect a portion of the mesh subassembly, such as a wire.

The first criteria and the second criteria may each define maximum and minimum differences between samples, corresponding to various object sizes. The first and the second criteria may differ from one another by the ranges that they respectively define. In another related embodiment, the first criteria, second criteria, or both, are varied in response to the speed of the fastening tool's motion.

If the second criteria is met at 320, the fastening tool may be activated at 324 to deploy a fastener to the fastening site. On the other hand, if the second criteria is not met at 320, a scan may be performed in a region surrounding the nominal expected fastening site at 322, and the process may loop back to 316.

In a related embodiment, a time limit may be defined for locating a fastening site. Failure to meet the time limit may trigger an exception indication in controller 150. Various responses to an exception are contemplated according to some embodiments. For instance, the present fastening site may be skipped in the interest of preserving operational throughput. The assembly may be tagged or otherwise associated with the missed fastening site for later rework.

The rework may be performed on the same machine while the subassemblies are in place in the working zone, or the rework may be performed at a separate operational unit of the factory. In some instances, a certain number of missed fastening sites may be tolerable provided that the missed sites are spread apart from one another.

Following the successful fastening operation (or skipping the fastening site as per exception handling procedure), the process loops back to 302 to determine shuttling movement to the next nominal expected fastening site. As discussed above, the movement may be determined to require avoidance of known obstacles based on the current position of the fastening tool, and on the recipe carried out.

In a related embodiment, the controller is programmed to process the sampled output of the proximity sensor to store a set of proximity measurement samples in a buffer. A running statistical summary (e.g., running average) of the samples in the buffer may be computed, with the first criteria and the second criteria being applied against the statistical summary. This computation tends to dampen noise on the one hand, while also making the analysis tolerant of gradual changes (e.g., varying thickness of a frame subassembly member).

Figure 4:
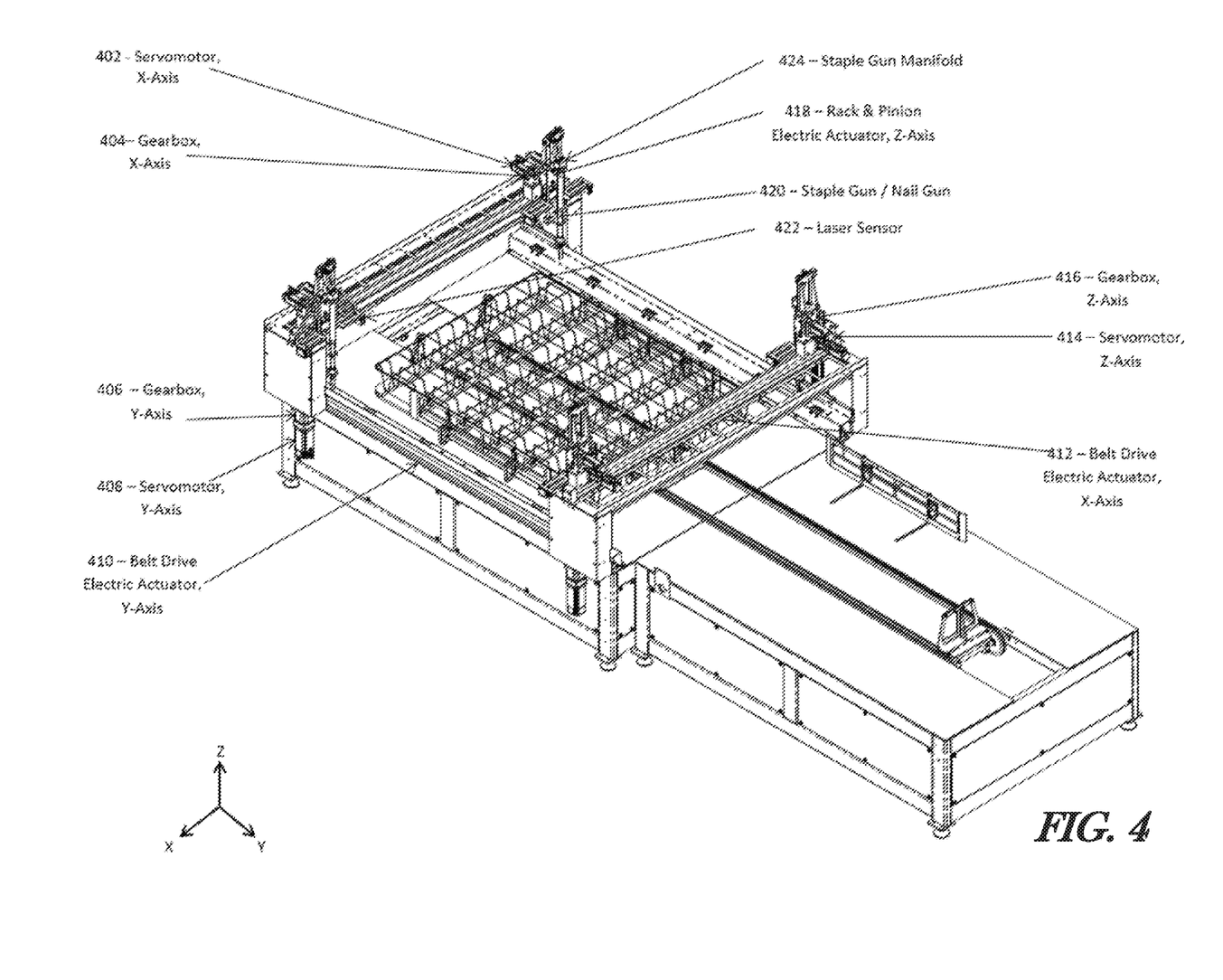
FIG. 4 is an isometric view diagram illustrating a MFS according to some embodiments.

FIG. 4 is an isometric view diagram illustrating a MFS according to some embodiments. In the example depicted, there are four fastening tools, namely, staple guns, as labeled. FIG. 4 illustrates X-axis servo motor 402, gearbox 404, and belt drive actuator 412. Similarly, Y-axis servo motor 408 is shown, along with gearbox 406 and belt drive actuator 410. Z-axis servo motor 414 is shown along with Z-axis gearbox 416 and rack and pinion actuator 418. Staple gun 420 and manifold 424 are shown, as is laser sensor 422.

Figure 5:
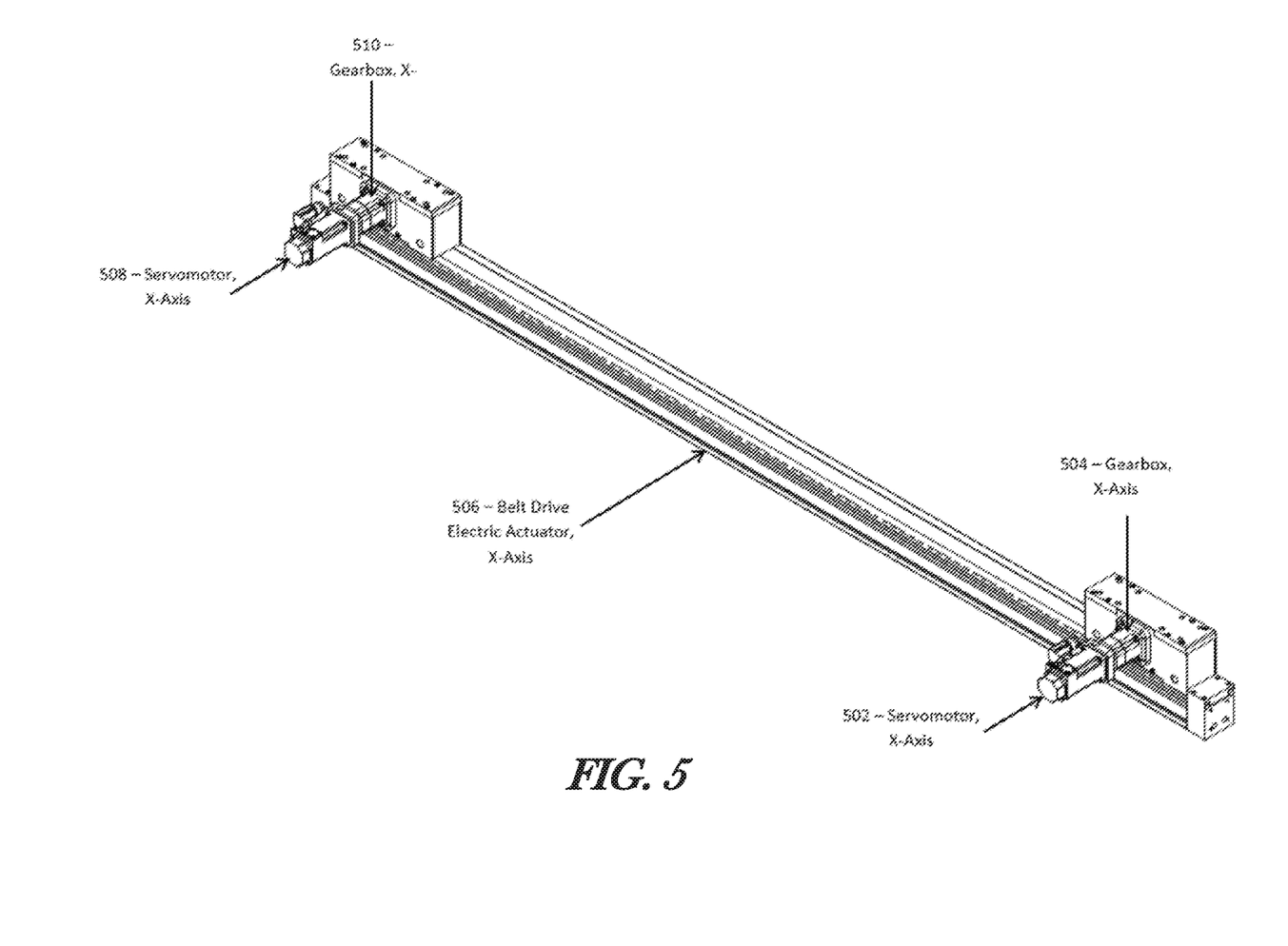
FIG. 5 is an isometric view diagram illustrating details of the x-axis mechanics for the example embodiment of FIG. 4.

FIG. 5 is an isometric view diagram illustrating details of the x-axis mechanics for the example embodiment of FIG. 4. These include servo motors 502 and 508, gearboxes 504 and 510, and belt drive actuator 506.

Figure 6:
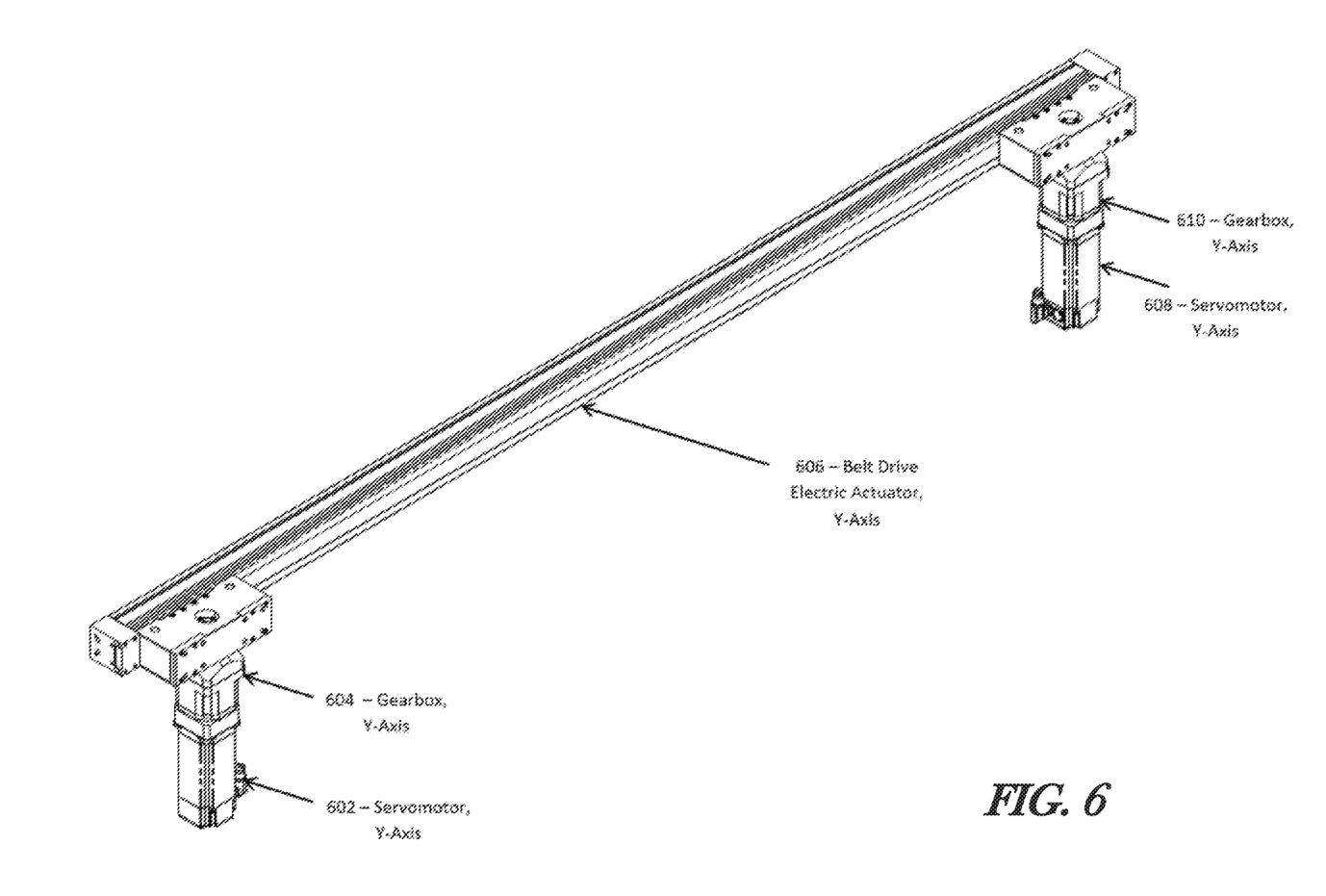
FIG. 6 is an isometric view diagram illustrating details of the x-axis mechanics for the example embodiment of FIG. 4.

FIG. 6 is an isometric view diagram illustrating details of the x-axis mechanics for the example embodiment of FIG. 4. These include servo motors 602 and 608, gearboxes 604 and 610, and belt drive actuator 606.

Figure 7:
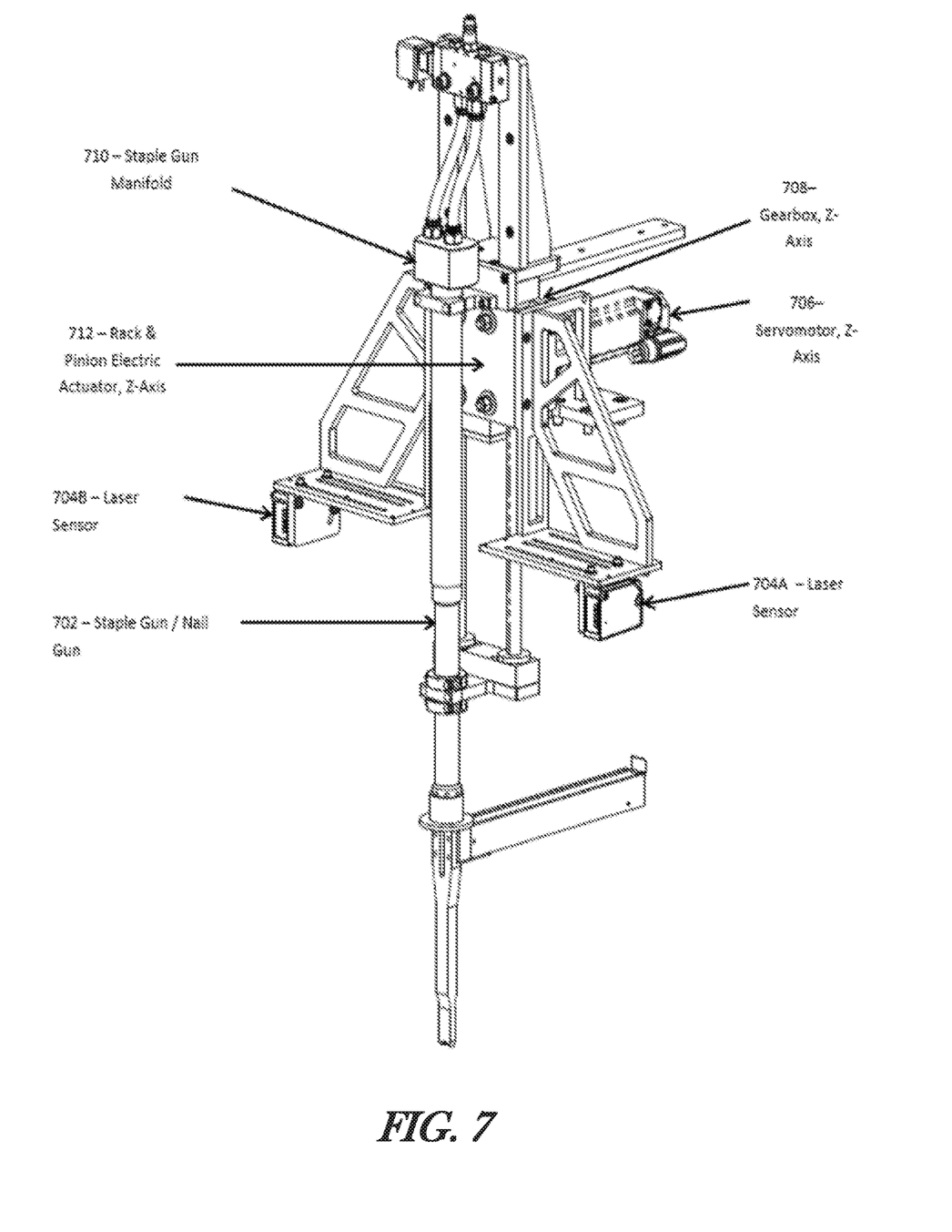
FIG. 7 is an isometric view diagram illustrating details of the Z-axis mechanics and other components for the example embodiment of FIG. 4.

FIG. 7 is an isometric view diagram illustrating details of the Z-axis mechanics and other components for the example embodiment of FIG. 4. As shown, staple gun/nail gun 702 is situated towards the bottom of the assembly. Two laser sensors 704A, 704B are provided. Servo motor 706, gearbox 708, and rack and pinion actuator 712 are shown. Staple gun manifold 710 is depicted as well.

Additional Examples

Example 1 is a mesh-fastening system comprising: a materials receiving zone and a working zone adjacent to the materials receiving zone, wherein: the materials receiving zone includes, a receiving surface arranged to receive a frame subassembly and a mesh subassembly that is not fastened to the frame subassembly while a second frame subassembly and a second mesh subassembly are in the working zone; and the working zone includes a robotic fastening system operative to autonomously fasten the mesh subassembly to the frame subassembly at a plurality of fastening sites, the working zone further including a retractable boundary structure arranged to selectively permit or prevent movement of the frame subassembly along a forward direction; a conveyor including a first pushing surface and a second pushing surface mechanically coupled to a shuttling actuator, the conveyor arranged to advance the frame subassembly and mesh subassembly to the working zone from the receiving zone while advancing the second frame subassembly and the second mesh subassembly from the working zone by operation of the shuttling actuator, wherein the shuttling actuator is operative to: cause the first pushing surface to engage with the frame subassembly and translate the frame subassembly and mesh subassembly into the working zone along the forward direction; cause the second pushing surface to engage with the second frame subassembly and translate the second frame subassembly and the second mesh subassembly out from the working zone along the forward direction while the retractable boundary structure is in a retracted position; and maintain a biasing force on the frame subassembly along the forward direction while the frame subassembly is in the working zone and the retractable boundary structure is in an engaged position.

In Example 2, the subject matter of Example 1 includes, wherein the first pushing surface and the second pushing surface are each oriented perpendicular to the forward direction.

In Example 3, the subject matter of Examples 1-2 includes, wherein the conveyor includes a linear traveler coupled to the first pushing surface, the linear traveler arranged to move translationally along the forward direction.

In Example 4, the subject matter of Example 3 includes, wherein the linear traveler is coupled to the second pushing surface.

In Example 5, the subject matter of Examples 3-4 includes, wherein the linear traveler comprises a band having a loop with a length dimension situated along the forward direction, and wherein the first pushing surface and the second pushing surface each protrudes outwardly from an exterior surface of the band.

In Example 6, the subject matter of Examples 3-5 includes, wherein the linear traveler is driven by a motor with a controllable torque output, and wherein the controllable torque output is used to produce the biasing force.

In Example 7, the subject matter of Examples 1-6 includes, wherein the working zone includes a working surface arranged to support the frame subassembly when the frame subassembly is in the working zone; wherein the frame subassembly comprises a set of bearer boards having lengths oriented along a first direction, and a set of slats fastened over the bearer boards, wherein the slats are supported by the bearer boards and span at least one gap defined between a bottom surface of the slats and the bearer boards; and wherein the working surface includes at least one support structure that protrudes upwardly from the working surface and engages with the bottom surface of at least one corresponding slat when the frame subassembly is in the working zone and subjected to the biasing force and when the first direction is aligned with the forward direction.

In Example 8, the subject matter of Example 7 includes, wherein the at least one support structure is formed as a ramp having an increasing height toward the forward direction such that engagement between the at least one support structure and the bottom surface of the slats is progressively strengthened as the frame subassembly is advanced along the forward direction.

Example 9 is a robotic fastening system operative to autonomously fasten a first subassembly to a second subassembly at a plurality of fastening sites, the system comprising: a fastening tool arranged to deploy fasteners to secure portions of the first subassembly to the second subassembly at various ones of the fastening sites; a set of actuators arranged to move the fastening tool to the various ones of the fastening sites, wherein fastening tool is movable along a longitudinal direction, a transverse direction, and a height direction; a proximity sensor fixed proximate the fastening tool and movable with the fastening tool; a controller circuit operative to individually control each of the set of actuators and to read an output of the proximity sensor, wherein the controller circuit is programmed to execute a fastening-tool movement routine to move the fastening tool to a first one of the fastening sites wherein: the fastening tool is initially moved toward a nominal expected position of the first one of the fastening sites according to a predefined movement profile; on approach of the fastening tool to the first one of the fastening sites, an output of the proximity sensor is compared against first detection criteria; in response to satisfaction of the first detection criteria, the motion of the fastening tool is adjusted and the output of the proximity sensor is compared against second detection criteria that is different from the first detection criteria; in response to satisfaction of the second detection criteria, the fastening tool deploys a fastener to secure the first subassembly to the second subassembly at the first one of the fastening sites.

In Example 10, the subject matter of Example 9 includes, wherein the proximity sensor is a laser proximity sensor.

In Example 11, the subject matter of Examples 9-10 includes, wherein the first subassembly comprises a wire mesh structure.

In Example 12, the subject matter of Examples 9-11 includes, wherein the second subassembly comprises a frame structure.

In Example 13, the subject matter of Examples 9-12 includes, wherein the first detection criteria includes criteria to detect a first edge of the frame structure.

In Example 14, the subject matter of Examples 9-13 includes, wherein the second detection criteria includes criteria to detect a portion of the first subassembly.

In Example 15, the subject matter of Example 14 includes, wherein the second detection criteria includes a range of topographic feature heights and a range of topographic feature widths.

In Example 16, the subject matter of Examples 9-15 includes, wherein the controller circuit is further operative to process the output of the proximity sensor to store a plurality of proximity measurement samples and compute a running statistical summary of the plurality of samples, and wherein the first detection criteria and the second detection criteria each defines a range of proximity differences between a current at least one proximity sample and the statistical summary.

In Example 17, the subject matter of Examples 9-16 includes, wherein the first detection criteria and the second detection criteria are dynamically varied based on speed of the motion of the fastening tool.

In Example 18, the subject matter of Examples 9-17 includes, wherein the predefined movement profile includes motion of the fastening tool in a direction perpendicular to an expected edge of the frame structure.

In Example 19, the subject matter of Examples 9-18 includes, wherein the adjusted motion of the fastening tool includes motion in a direction perpendicular to an expected neutral axis of a portion of the first subassembly.

In Example 20, the subject matter of Examples 9-19 includes, wherein the adjusted motion of the fastening tool includes motion at a slower speed than the initial movement.

In Example 21, the subject matter of Examples 9-20 includes, wherein the predefined movement profile includes motion of the fastening tool along a curvilinear trajectory.

In Example 22, the subject matter of Example 21 includes, wherein the curvilinear trajectory is selected from the group consisting of: a parabolic trajectory, an elliptical trajectory, a semi-elliptical trajectory, or any combination thereof.

In Example 23, the subject matter of Examples 9-22 includes, wherein the initial movement of the fastening tool according to the predefined movement profile includes scanning of the fastening tool in a predefined region proximate the nominal expected position of the first one of the fastening sites.

In Example 24, the subject matter of Examples 9-23 includes, wherein the controller circuit is programmed to vary the predefined movement profile in response to the output of the proximity sensor.

In Example 25, the subject matter of Example 24 includes, wherein variation of the predefined movement profile includes variation of speed, variation of trajectory, or any combination thereof.

In Example 26, the subject matter of Examples 24-25 includes, wherein the controller circuit is programmed to vary the predefined movement profile in response to the output of the proximity sensor that includes collision detection.

In Example 27, the subject matter of Examples 9-26 includes, wherein the controller circuit is programmed to indicate an exception condition in response to non-satisfaction of the second detection condition.

In Example 28, the subject matter of Examples 9-27 includes, wherein the controller circuit is programmed to forgo deployment of the fastener at the first one of the fastening sites in response to the exception condition indication.

In Example 29, the subject matter of Examples 9-28 includes, wherein the controller circuit is programmed to execute a rework routine at the first one of the fastening sites in response to the exception condition indication.

Example 30 is at least one machine-readable medium including instructions that, when executed by processing circuitry, cause the processing circuitry to perform operations to implement of any of Examples 1-29.

Example 31 is an apparatus comprising means to implement of any of Examples 1-29.

Example 32 is a system to implement of any of Examples 1-29.

Example 33 is a method to implement of any of Examples 1-29.

The embodiments above are intended to be illustrative and not limiting. Additional embodiments are within the claims. In addition, although aspects of the present invention have been described with reference to particular embodiments, those skilled in the art will recognize that changes may be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A robotic fastening system operative to autonomously fasten a first subassembly to a second subassembly at a plurality of fastening sites, the system comprising:
a fastening tool arranged to deploy fasteners to secure portions of the first subassembly to the second subassembly at various ones of the fastening sites;
a set of actuators arranged to move the fastening tool to the various ones of the fastening sites, wherein the fastening tool is movable along a longitudinal direction, a transverse direction, and a height direction;
a proximity sensor fixed proximate the fastening tool and movable with the fastening tool;
a controller circuit operative to individually control each of the set of actuators and to read an output of the proximity sensor, wherein the controller circuit is programmed to execute a fastening-tool movement routine to move the fastening tool to a first one of the fastening sites wherein:
the fastening tool is initially moved toward a nominal expected position of the first one of the fastening sites according to a predefined movement profile;
on approach of the fastening tool to the first one of the fastening sites, and while the fastening tool is in motion to the first one of the fastening sites an output of the proximity sensor is compared against first detection criteria;
in response to satisfaction of the first detection criteria, a speed of the motion of the fastening tool is adjusted while the fastening tool is in motion to the first one of the fastening sites, and the output of the proximity sensor is compared against second detection criteria that is different from the first detection criteria; and
in response to satisfaction of the second detection criteria, the fastening tool deploys a fastener to secure the first subassembly to the second subassembly at the first one of the fastening sites.

2. The system of claim 1, wherein the first detection criteria includes criteria to detect a first edge of the second subassembly and wherein the second detection criteria includes criteria to detect a portion of the first subassembly.

3. The system of claim 1, wherein the controller circuit is further operative to process the output of the proximity sensor to store a plurality of proximity measurement samples and compute a running statistical summary of the plurality of samples, and wherein the first detection criteria and the second detection criteria each defines a range of proximity differences between a current at least one proximity sample and the statistical summary.

4. The system of claim 1, wherein the first detection criteria and the second detection criteria are dynamically varied based on speed of the motion of the fastening tool.

5. The system of claim 1, wherein the predefined movement profile includes motion of the fastening tool in a direction perpendicular to an expected edge of the second subassembly.

6. The system of claim 1, wherein the adjusted motion of the fastening tool includes motion in a direction perpendicular to an expected neutral axis of a portion of the first subassembly.

7. The system of claim 1, wherein the adjusted motion of the fastening tool includes motion at a slower speed than the initial movement.

8. The system of claim 1, wherein the predefined movement profile includes translational motion of the fastening tool along a curvilinear trajectory along each of three orthogonal axes.

9. The system of claim 8, wherein the curvilinear trajectory includes a parabolic trajectory.

10. The system of claim 8, wherein the curvilinear trajectory includes an elliptical or semi-elliptical trajectory.

11. The system of claim 1, wherein the initial movement of the fastening tool according to the predefined movement profile includes scanning of the fastening tool in a predefined region proximate the nominal expected position of the first one of the fastening sites.

12. The system of claim 1, wherein the controller circuit is programmed to vary the predefined movement profile in response to the output of the proximity sensor.

13. The system of claim 12, wherein the controller circuit is programmed to vary the predefined movement profile in response to the output of the proximity sensor that includes collision detection.

14. The system of claim 1, wherein the controller circuit is programmed to indicate an exception condition in response to non-satisfaction of the second detection criteria.

15. The system of claim 1, wherein the controller circuit is programmed to forgo deployment of the fastener at the first one of the fastening sites in response to the exception condition indication.

16. The system of claim 1, wherein the proximity sensor comprises at least one laser-based distance sensor.

17. The system of claim 1, wherein the proximity sensor comprises at least one confocal chromatic sensor.

18. The system of claim 1, wherein in response to satisfaction of the first detection criteria, a direction of the motion of the fastening tool is adjusted while the fastening tool is in motion to the first one of the fastening sites.

* * * * *